United States Patent [19]
Hussaini

[11] Patent Number: 5,911,395
[45] Date of Patent: Jun. 15, 1999

[54] UNIVERSALLY ADJUSTABLE MOUNTING BRACKET

[75] Inventor: Saied Hussaini, Miami, Fla.

[73] Assignee: Rally Manufacturing, Inc., Miami, Fla.

[21] Appl. No.: 08/786,143

[22] Filed: Jan. 21, 1997

[51] Int. Cl.⁶ .................................................. A45D 42/14
[52] U.S. Cl. ................................. 248/206.3; 248/206.4; 248/316.4
[58] Field of Search ............................ 248/206.3, 206.2, 248/206.4, 160, 104, 229.17, 274.1, 363, 316.2, 316.4, 316.6, 208, 309.1

[56] References Cited

U.S. PATENT DOCUMENTS

| | | | |
|---|---|---|---|
| Re. 34,120 | 11/1992 | Plahn | 248/206.3 |
| D. 291,176 | 8/1987 | Sokol | D8/380 |
| D. 331,005 | 11/1992 | Plahn | D8/355 |
| 810,604 | 1/1906 | Baier | 248/208 |
| 977,395 | 11/1910 | Norton | 248/206.3 |
| 1,772,439 | 8/1930 | Garbs | 248/205.5 |
| 1,786,459 | 12/1930 | Simons | 248/104 |
| 2,510,198 | 6/1950 | Tesmer | 248/274.1 |
| 4,648,572 | 3/1987 | Sokol | 248/206.2 |
| 4,696,447 | 9/1987 | Strecker | 248/206.3 |
| 4,760,497 | 7/1988 | Roston | 361/427 |
| 4,836,482 | 6/1989 | Sokol | 248/206.3 |
| 4,842,174 | 6/1989 | Sheppard et al. | 248/160 |
| 4,863,130 | 9/1989 | Marks | 248/206.3 |
| 4,867,402 | 9/1989 | Benson et al. | 248/206.2 |
| 4,896,855 | 1/1990 | Furnish | 248/206.3 |
| 5,014,947 | 5/1991 | Wang | 248/214 |
| 5,016,850 | 5/1991 | Plahn | 248/206.3 |
| 5,017,144 | 5/1991 | Waidhofer | 439/34 |
| 5,020,754 | 6/1991 | Davis et al. | 248/206.3 |
| 5,029,787 | 7/1991 | Florentin | 248/206.3 |
| 5,085,390 | 2/1992 | Murphy | 248/311.2 |
| 5,103,384 | 4/1992 | Drohan | 362/191 |
| 5,187,744 | 2/1993 | Richter | 379/449 |
| 5,246,193 | 9/1993 | Faidley | 248/206.3 |
| 5,313,337 | 5/1994 | Byers | 359/872 |
| 5,386,960 | 2/1995 | O'Brien | 248/205.5 |
| 5,573,214 | 11/1996 | Jones et al. | 248/311.2 |
| 5,695,164 | 12/1997 | Hartmann et al. | 248/316.4 |

*Primary Examiner*—Ramon O. Ramirez
*Assistant Examiner*—Gwendolyn Baxter
*Attorney, Agent, or Firm*—Liniak, Berenato, Longacre & White

[57] ABSTRACT

A bracket structure retains a radar detector at an interior surface of a vehicle, wherein the bracket provides a universal adjustment between the mounting plate attached to the interior surface and the supporting structure which carries the radar detector. A flexible arm on the bracket may be formed of a wire or other material which does not cold work during deformation to thereby provide an infinite number of adjustment positions for the radar detector. The supporting structure comprises a pair of legs which slidingly engage one another to accommodate radar detectors of various widths.

4 Claims, 2 Drawing Sheets

UNIVERSALLY ADJUSTABLE MOUNTING BRACKET

BACKGROUND OF THE INVENTION a) Field of the Invention

The present invention relates to a universally adjustable windshield mountable bracket for radar detectors, frequency scanners, laser signal receivers, and the like.

b) Brief Description of the Prior Art

A radar detector is a popular item as an accessory in motor vehicles. It is an item of significant value that should be concealed while a vehicle is parked in a public area.

In order to keep such a device from public view, costly remote mounted detectors with dashboard and under-dashboard controls have been provided but these controls obstruct free movement of the body in under the dashboard area or project outwardly from the dash in an obstructing manner.

Brackets to hold detectors are generally windshield mounted or clipped onto the windshield visor and either have a nonadjustable angular relationship between the bracket mount and the support portion of the bracket or have a linear hinge with a limited adjustment to hold the detector.

The above and other disadvantages are overcome by the bracket structure of the present invention.

SUMMARY OF THE INVENTION

It is an object of the present invention to provide a substantial improvement in a bracket structure to retain a radar detector.

It is a further object of the invention to provide a bracket which provides a universal adjustment between the mounting plate attached to a windshield and the supporting plate or retainer which carries the radar detector.

A flexible arm on the bracket is formed of a wire or other material which is flexible but does not cold work during deformation to thereby provide an infinite number of adjustment positions for the radar detector without breaking.

The instant bracket provides further improvement by permitting adjustment in any desired direction.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
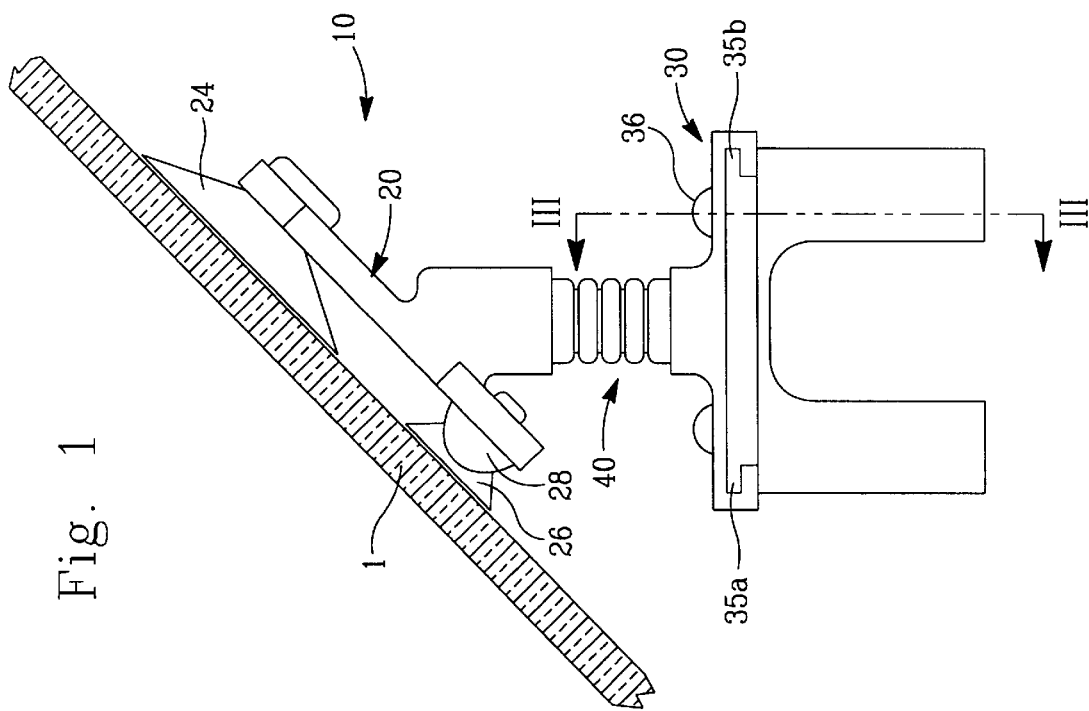
FIG. 1 is a side view of the bracket of this invention shown attached to a windshield.

Referring to the drawings, in FIG. 1, a windshield 1 of an automotive vehicle is shown and mounted thereto in operating position is a bracket 10 which exemplifies the instant invention.

The bracket 10 has two separate operating parts, a windshield mount or mounting plate structure 20 and a radar detector supporting plate structure or retainer 30 and these two parts are operatively connected by a universally flexible arm 40.

The mounting plate structure 20 comprises flat plate member 22 having a substantially tri-pod shape in plan. The mounting plate structure 20 comprises a main suction cup 24 and a secondary or two suction cup 26; these two suction cups 24, 26 are substantially aligned along the vertical axis. The plate member 22 has two wings or arms 27 which project away on opposite directions of the suction cups 24, 26. Mounted on an end of each arm 27 is a stabilizing bumper 28. The bumpers 28 are preferably made of rubber and serve to stabilize the mounting plate 20 against the surface of the window 1.

The suction cups 24, 26 are secured to the plate member 22 for self-adjustment therewith and in the preferred embodiment the suction cups 24, 26 snap-fit into an aperture provided on the plate member 22.

The supporting plate structure or retainer 30 is substantially claw-like in shape comprising first and second L-shaped legs 32, 34. The flexible arm 40 is fixedly mounted on the second L-shaped leg 34, and the first L-shaped leg 32 slidingly engages the second L-shaped leg 34 to thereby accommodate radar detectors of various widths (see width 'W' in FIG. 2). FIG. 1 illustrates the slots or channels 35a, 35b which enable the L-shaped legs 32, 34 to engage on another in a sliding manner.

Figure 4:
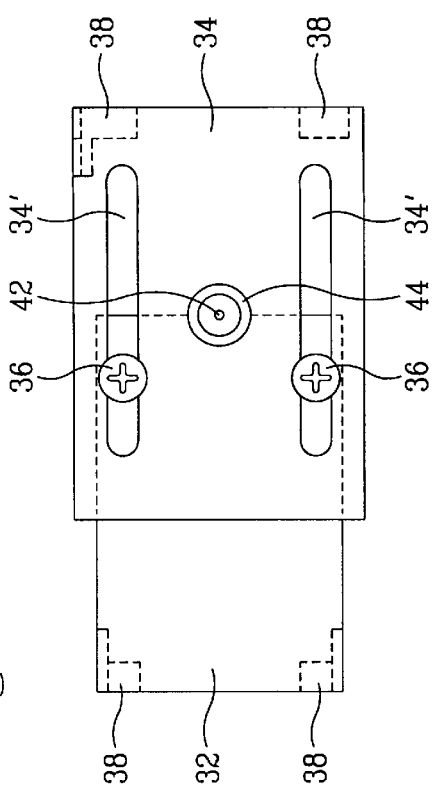
FIG. 4 is a top view of the supporting plate or retainer of the bracket of this invention taken along line IV—IV of FIG. 2.
Figure 5:
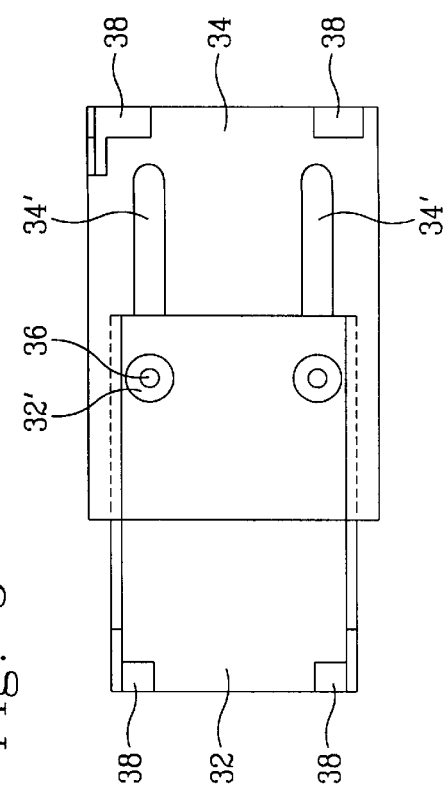
FIG. 5 is a bottom view of the bracket of this invention.
Figure 3:
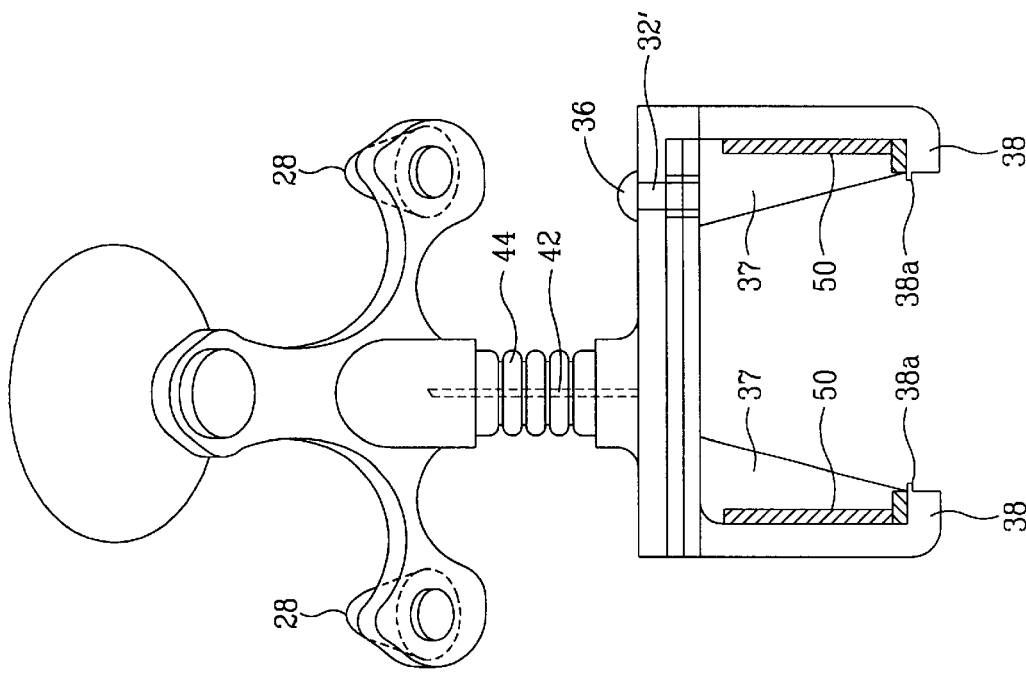
FIG. 3 is a cross sectional view of the bracket of this invention taken on line III—III of FIG. 1.

The relative position of the L-shaped legs 32, 34 is maintained by button head screws 36 which pass through a slots 34' in the second L-shaped leg 34 and threadingly engage a nut or insert 32' embedded in the first L-shaped leg 32 (see FIGS. 3–5). The button head screws 36 are tightened to lock the first leg 32 relative to the second leg 34 at a set width 'W'.

Operatively connecting the mounting plate 20 and the support member 30 is a flexible arm 40. The flexible arm 40 comprises a wire 42 which does not cold work during deformation and a corrugated sheath 44 which overlies and protects the wire 42. The flexible arm 40 is capable of bending in any direction. Further, the wire 42 is formed to resist breakage because it does not cold work during deformation; such articles are known in the art of metallurgy and provide a novel advantage when applied to this invention. An example of a non-cold working metal is common tin and silver silder.

Figure 2:
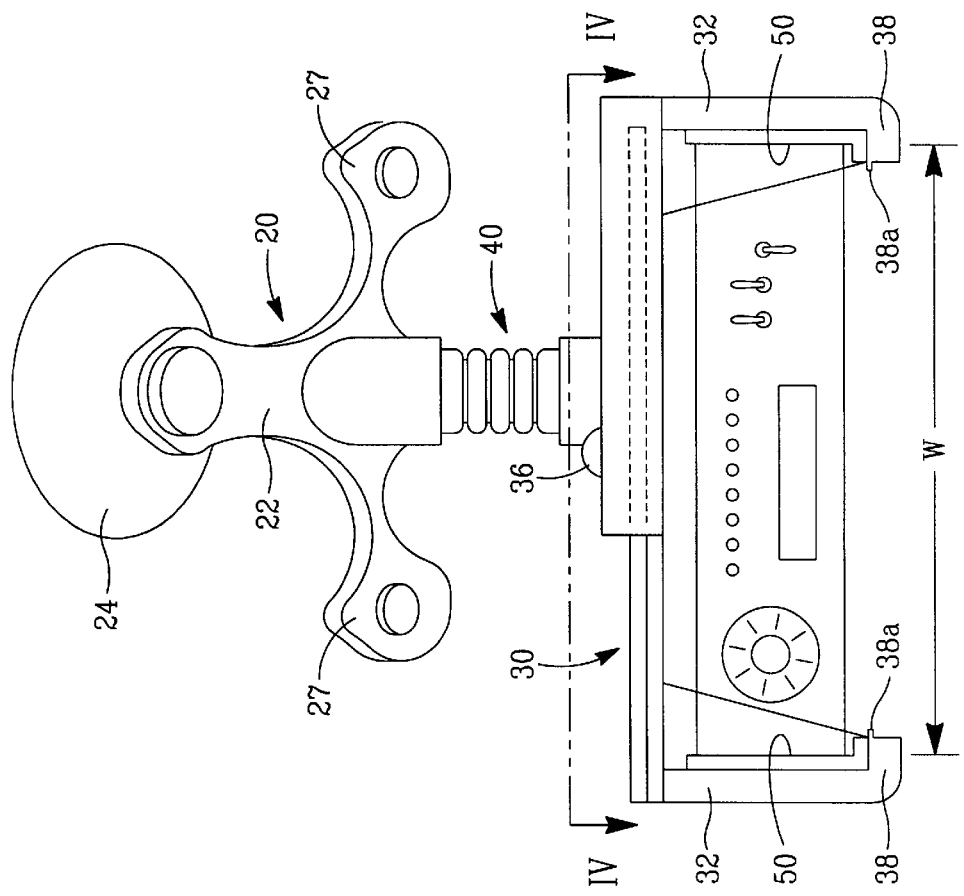
FIG. 2 is a front view of the bracket of this invention with a generic radar detector mounted therein.

Referring to FIG. 2, the radar detector is shown in mounted position as held by the flanges 38 of the L-shaped legs 32, 34. The radar detector is readily inserted into or removed from its operating position. In a preferred embodiment, the L-shaped legs 32, 34 and the flanges 38 provided thereon have a rubber pad 50 along an engaging surface for increasing a frictional resistance between the bracket and the radar detector, and for lessening an impact force therebetween. The tangs 38a of flanges 38 are designed for mounting the device from sides with the device being held and supported by tangs 38a (see FIG. 3). Moreover, the webs 37 are designed to prevent protrusion of the device.

The bracket of this invention having suction cups, stabilizing bumpers and a bendable neck is very easily mounted onto a windshield and the suction cups have a loose fitting connection to accommodate the curvature of a windshield.

When the vehicle having this bracket therein is parked in a public area, the bracket is easily removed for storage in a hidden location. Moreover, the flexible neck connecting the mounting plate 20 to the support plate 30 provides a stable universal adjustment of the radar detector, thereby improving and increasing the number of useable and convenient locations for the radar detector.

While the foregoing invention has been shown and described with respect to a preferred embodiment, it will be understood by those possessing skill in the art that various changes in form and detail may be made therein without departing from the spirit and scope of the instant invention.

What is claimed is:

1. An apparatus for removably mounting an article on an interior surface of a passenger compartment of an automobile, said apparatus comprising:

a substantially tri-pod shaped mounting plate structure for detachably coupling said apparatus to said interior surface of said passenger compartment, said mounting plate structure having a main suction cup mounted to a first side thereof;

a secondary suction cup mounted to said first side;

a pair of wing arms oppositely projecting outward in a direction substantially orthogonal to a line extending between said main and secondary suction cups, said pair of wing arms each having a stabilizing bumper attached thereto on said first side of said mounting plate structure and adapted to stabilize said mounting plate structure against said interior surface of said passenger compartment when said suction cups are attached to said interior surface;

a supporting plate structure for detachably engaging said article thereby forming a connection between said article and said interior surface of said passenger compartment; and a bendable arm member flexibly coupling said mounting plate structure to said supporting plate structure, said bendable arm member having an elongated bendable arm adapted to selectively suspend and maintain said supporting plate structure in free space and permitting orientation of said supporting plate in a plurality of positions through six degrees of freedom relative to said mounting plate structure.

2. The apparatus according to claim 1, wherein said main and secondary suction cups are snap-fitted to said mounting plate structure.

3. The apparatus according to claim 1, wherein said supporting plate structure is formed in a substantially claw-like shape defined by:

a first and a second L-shaped leg slidingly engaging one another to accommodate an article having different widths, said supporting plate having a means for maintaining said first and second legs in fixed relative position to one another thereby retaining said article.

4. The apparatus according to claim 1 wherein said flexible arm further comprises a metal wire formed of a non-cold working metal.

* * * * *